United States Patent [19]
Caron et al.

[11] Patent Number: 4,910,763
[45] Date of Patent: Mar. 20, 1990

[54] SWITCHING DEVICE FOR CONNECTING A DATA TRANSMISSION SYSTEM TO THE TELEPHONE SWITCHED NETWORK

[75] Inventors: Francois Caron, Cagnes Sur Mer; Jean Cholat-Namy, Juan Les Pins; Emile Morlec, Saint Paul, all of France

[73] Assignee: International Business Machines Corp., Armonk, N.Y.

[21] Appl. No.: 322,017

[22] Filed: Mar. 13, 1989

[30] Foreign Application Priority Data

Mar. 15, 1987 [EP] European Pat. Off. ........ 88480008.7

[51] Int. Cl.⁴ .......................................... H04M 11/06
[52] U.S. Cl. ........................................ 379/98; 375/36
[58] Field of Search ................ 340/825.01; 371/8, 11, 371/8.1, 8.2, 11.1, 11.2; 375/7, 36, 40; 379/2, 32, 33, 28, 93, 96, 97, 98, 442, 443

[56] References Cited

U.S. PATENT DOCUMENTS

| | | | |
|---|---|---|---|
| 4,076,961 | 2/1978 | Holsinger et al. | 379/2 |
| 4,607,139 | 8/1986 | Froment et al. | 379/93 |

FOREIGN PATENT DOCUMENTS

0036950 3/1977 Japan .............................. 340/825.01

OTHER PUBLICATIONS

IBM Technical Disclosure Bulletin, vol. 28, No. 8, Jan. 1986, pp. 3250–3251, New York, U.S.; "Adapter for Connecting a Multipoint Moden Network to the Public Switched Network".
Patent Abstracts of Japan, vol. 12, No. 65 (E-586) (2912), Feb. 27, 1988; & JP-A-62 208 746 (Fujitsu Ltd.) 14-09-1987.
IBM Technical Disclosure Bulletin, vol. 24, No. 8, Jan. 1982, pp. 4268–4269, New York, U.S.; M. Cukier et al.: "Non-disruptive Switched Network Back-up".

Primary Examiner—Keith E. George
Attorney, Agent, or Firm—Edward H. Duffield

[57] ABSTRACT

A data transmission system is described which includes a switching circuit that enables the connection of a tributary modem to a control modem via the public switched network. Switching occurs when it is no longer possible to transmit data on the leased network because the line connected to the tributary modem has failed. The switching circuit can connect either the permanent leased line or the switched network to the receiver of the control modem. It comprises a narrow pass-band filter and detector which is permanently connected between the reception side of the switched network and the control modem receiver. When the tributary modem answers a call from the control modem, it sends a tone ahead of the data message, the frequency of which tone corresponds to the frequency of the pass-band filter and is out of the data band. When such a tone is detected by the detector and pass-band filter, the control modem toggles a two position switch which isolates the leased line and connects the switched network to the receiver of the control modem.

5 Claims, 2 Drawing Sheets

SWITCHING DEVICE FOR CONNECTING A DATA TRANSMISSION SYSTEM TO THE TELEPHONE SWITCHED NETWORK

FIELD OF THE INVENTION

This invention relates to the transmission of data by means of analog signals over telephone lines; more particularly, it relates to a data transmission system connectable to the telephone switched network when the currently used leased line has failed.

PRIOR ART

In data transmission systems wherein data are transmitted as analog signals over telephone lines, the intelligence to be conveyed takes the form of modulations of a carrier signal. Generally, the carrier signal is modulated by a modulator at the sending end and demodulated by a demodulator at the receiving end, the modulator/demodulator combination being called a modem. Therefore, where data signals are transmitted between a pair of remote data terminal equipments (DTEs), it is as if the data signals were sent by a transmitting modem to a receiving modem.

Data signals are usually transmitted over telephone leased lines. Whenever a leased line becomes unavailable or unusable for any reason, the data can be sent over the public switched network when the modems are equipped with the so-called switched network backup facility.

The DTE's and their associated modems can communicate either in a point-to-point configuration, or in a multipoint configuration. In a multipoint configuration, a main DTE which is generally a host computer, communicates with several remote DTE's through the intermediary of a primary or control modem associated with the host. Tributary modems are each associated to one remote DTE.

When a leased line linking the host to a tributary modem fails, the problem is to provide efficient means for reconnection of the host computer to the tributary modem over the public switched network (PSN). One solution consists in providing an analog bridge connecting the control modem to the PSN. The most serious drawback of this solution is that the control modem receives all the noise from the PSN. This disturbs the data transmission to the other tributary modems of the multipoint network.

Another solution consists in using a special modem directly attached to a reserved gate of the host computer. However, this makes the management of the system very difficult and increases the cost due to the reserved gate, the special modem and the host program burden.

A solution which partially obviates the above drawbacks consists in using a digital bridge between the host computer and the two modems. The control modem is connected to the multipoint network by the leased line, and the special modem is connected to the public switched network. Thus, the link between the special modem and the tributary modem is of the point-to-point type whereas the host computer keeps on treating this modem as a tributary modem of the multipoint network. Such an implementation is described in the Article "Adapter for connecting a multipoint modem network to the public switched network" published in the IBM Technical Disclosure Bulletin, Vol. 28, No. 8, January 1986.

The above solution still has the drawback of requiring a special modem. Furthermore, it requires use of a bridge which is a specific unit to be inserted in the network.

OBJECTS OF THE INVENTION

Therefore, the object of the present invention is to provide a single improved control modem comprising a switching circuit which enables the modem to simultaneously serve the leased line and the public switched network without the drawback of receiving the noises of the PSN network as in the analog bridge solution.

BRIEF SUMMARY OF THE INVENTION

The system of the present invention comprises: a control device including a transmitter and a receiver, a plurality of tributary stations each also including a transmitter and a receiver, and a permanent transmission network for exchanging data between the control device and each tributary station. The permanent transmission network includes a principal line connected to the control device and tributary lines each connected, on the one hand, to one of the tributary stations and on the other hand, to the principal line according to a multipoint configuration. The control device comprises a switching circuit enabling it to be connected to the telephone switched network so as to continue exchanging data with one tributary station whose tributary line has failed. The switching circuit is comprised of connections for permanently connecting the transmitter of the control device to the transmitting side of the telephone switched network as soon as the control device has been warned that the tributary line has failed. A pass-band filter and detector connected between the receiving side of the telephone switched network and the receiver of the control device is adapted to detect a tone transmitted by the tributary station associated with the failed tributary line. A two-position switch is controlled by the control device for disconnecting the receiver of the control device from the receiving side of the principal line and connecting it to the receiving side of the telephone switched network in response to the reception of the tone by the control device.

BRIEF DESCRIPTION OF DRAWINGS

The invention will be more fully ascertained from the following description when read in conjunction with the accompanying drawings wherein.

Figure 1:
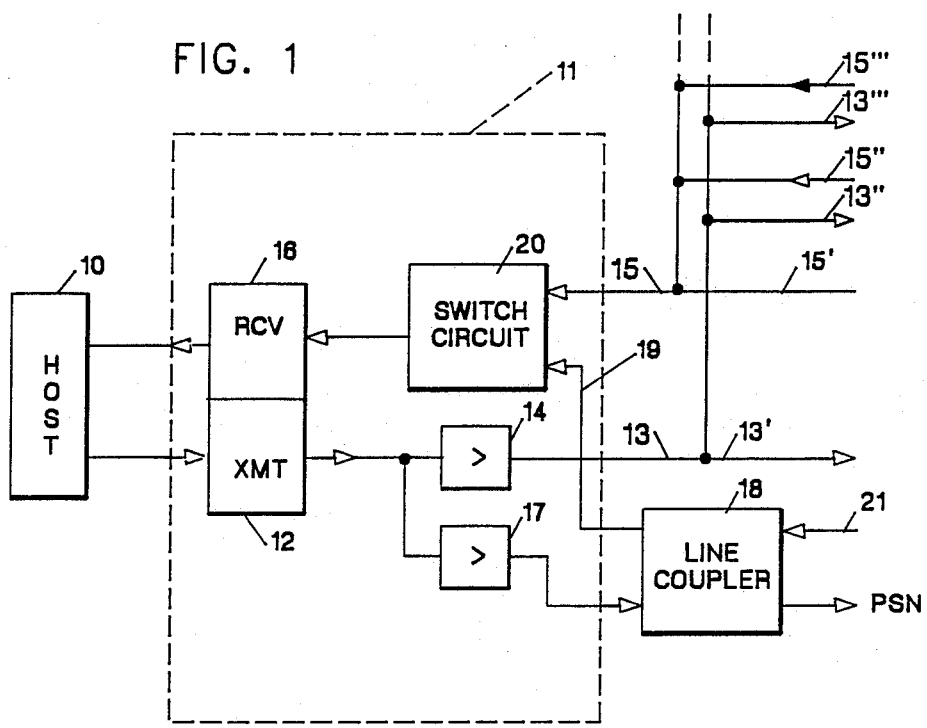
FIG. 1 is a block diagram representing a preferred embodiment of a modem equipped with the switching circuit enabling it to be connected either to the leased line or to the public switched network.

In reference to FIG. 1, the data signals from host 10 are transmitted in digital form to the control modem 11. After modulation in the transmitting part 12, the signals are transmitted in analog form to the remote modems in a multipoint configuration, over principal leased line 13 by the driver 14 and then over specific leased lines 13', 13", 13"'. Conversely, the data signals from remote modems are received in analog form on each of specific leased lines 15', 15", 15"' and on principal leased line 15, and after demodulation in the receiving part 16 of the modem, are transmitted in digital form to the host 10.

Let's assume that the specific leased line associated to one of the remote modems fails. If the control and tributary modems are provided with a so-called "switched network back-up facility", the control modem commands the connection of the remote modem to the public switched network. Control modem 11 keeps on being connected to the other modems of the multipoint configuration by leased line 15. In this case, switching circuit 20 enables control modem 11 to receive data signals on line 19 (over the public switched network) from the remote modem the associated leased line of which has failed, or from the other remote modems on leased line 15.

Figure 2:
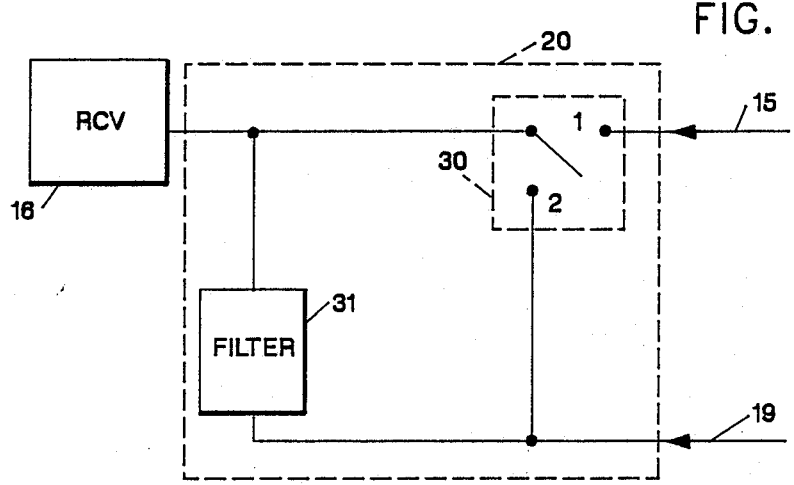
FIG. 2 shows the switching circuit included in FIG. 1.

FIG. 2 shows the details of switching circuit 20. The switching circuit includes a two-position switch 30 which is on position 1 as long as no remote leased line fails. In position 1, all data signals are received over line 15. If one remote leased line associated to a remote modem has failed, the remote modem is automatically disconnected from the leased line and connected to the public switched network (PSN) 19. Whenever the control modem sends a data message to this tributary modem, there is no problem for the data transmission from the control modem to the remote modem. Indeed, the data are transmitted over both leased line 13 (see FIG. 1) from driver 14, and over PSN line from driver 17.

Let's assume now that the message from the control modem is a call requesting the remote modem to send data. When the remote modem is ready for sending, it sends a tone immediately preceding the data message. This tone, which has a frequency outside the data frequency band, is received by pass-band filter 31 on line 19 from the PSN. When filter 31 detects such a tone, it warns the receiving part 16 of the modem which actuates switch 30 from position 1 to position 2.

With such a switching circuit, it is clear that the receiving part 16 of the modem is not connected to line 19 and to the PSN as long as switch 30 in on position 1. The connection to the PSN will be established only after detection of the tone by filter 31. Thus, the incorporation of this switching circuit avoids the control modem receiving noises from the PSN as is the case for the standard systems using an analog bridge. Furthermore, the control modem keeps on managing the remote modem transmitting over the PSN as it does the other tributary modems of the multipoint configuration.

The above advantages provided by the invention are obtained thanks to the permanent connection of filter 31 to PSN line 19. Filter 31 detects a tone out the data band. It must be noted that the presence of such a filter avoids the control modem receiving any tone signals before the data signals because such tones could be detrimental for the gain control of the modem. It is clear that such a tone could be replaced by a header or any digital signal preceding the data, provided that such a digital signal is encoded in a way that cannot be confused with the data and provided that filter 31 is replaced by a device able to detect this digital signal.

As it appears from FIG. 1, the invention has been described so far considering a 4-wire PSN link, i.e. a link that is on a 2-wire line, one line for the transmission from the control modem to the tributary modems, and one line for the transmission from the tributary modems to the control modem. However, the invention can also be implemented with a 2-wire PSN link utilizing a single line for both directions of transmission. Such an implementation is described in reference to FIG. 3.

Figure 3:
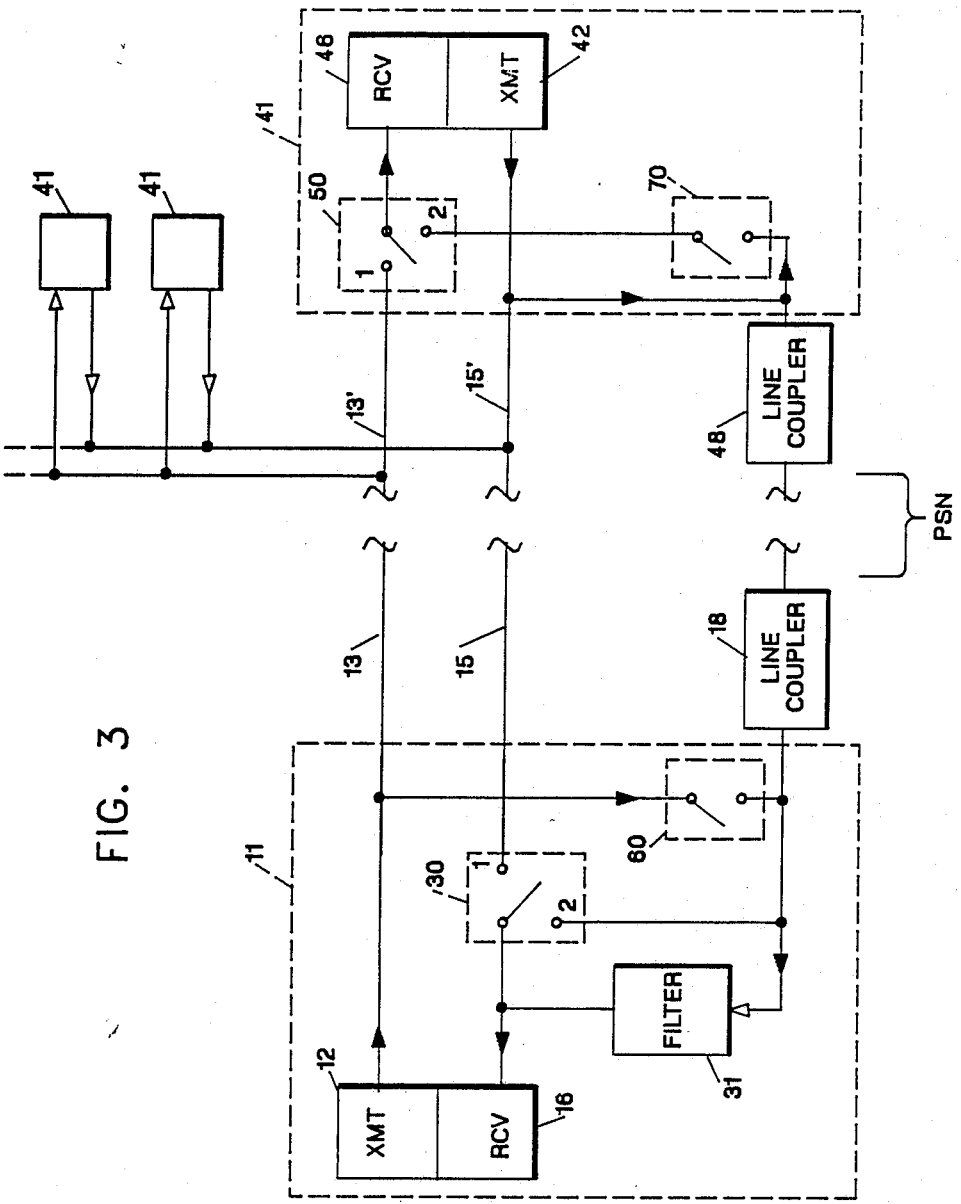
FIG. 3 depicts the application of the invention to the switched network using a two-wire line.

In FIG. 3, control modem 11 is connected to tributary modems 41 by principal leased line 13 associated to specific leased lines 13', 13", 13"'..., and 15', 15", 15"', the transmitting part 12 of the control modem being connected to the receiving part 46 of the tributary modem, and the receiving part 16 of the control modem being connected to the transmitting part 42 of the tributary modem.

In the absence of failure, the data messages are transmitted over leased lines 13-13' and 15-15' between control modem 11 and tributary modem 41. For this reason switches 30 and 50 are both on position 1. There are also two other switches 60 and 70, the function of which will be explained hereunder, which are normally closed.

Let us assume that leased line 13' and 15' fail or become unavailable. As soon as the control modem is aware of this failure, it sends the instruction, via the public switched network, to the tributary modem to activate switch 50 from position 1 to position 2. This action avoids the tributary modem receiving bad signals from the filed line. Therefore, the continuous carrier, which is currently transmitted by the control modem to the tributary modem via leased line 13-13', keeps on being transmitted to the tributary via closed switch 60, coupler 18, the public switched network, coupler 48 and closed switch 70. The data messages from the control modem to the tributary modem are transmitted by the same way.

As already explained, when the tributary modem is enabled to transmit data, a tone is first transmitted and detected by filter 31 which warns the receiving part 16 of control modem 11 in order to activate switch 30 from position 1 to position 2. It must be noted that this tone which is out of the data band, is not masked by the continuous carrier transmitted by the control modem.

The detection of the tone also causes switch 60 to be opened so as to cut off the transmission of the continuous carrier which would disturb the data flow from the tributary modem to the control modem. Likewise, switch 70 is opened as soon as the modem is ready to send data in order to avoid the receiving part of the tributary modem receiving the data sent by the transmitting part. Thus, it can be easily seen on FIG. 3 that data are transmitted from transmit part 42, via coupler 48, PSN, coupler 18 and switch 30 to the receiving part 16 of control modem 11.

From the above description, it appears that the switching circuit of the invention avoids the use of a special modem exclusively assigned to the public switched network, prevents the control modem from receiving noises from the public switched network when the switched network back-up facility is used, and enables the control modem to keep on treating the involved tributary modem as the other tributary modems of the multipoint configuration.

We claim:

1. In a data transmission system connectable to the telephone switched network, comprising a control device (11) including a transmitter (12) and a receiver (16), a plurality of tributary stations also including each a transmitter and a receiver, and a permanent transmission network for exchanging data between said control device and each of said plurality of tributary stations, said permanent transmission network including a principal link connected to said control device and tributary links each one being connected on the one hand to one of said tributary stations and on the other hand to said principal link according to a multipoint configuration, a switching device (20) enabling said control device to be connected to the telephone switched network so as to continue exchanging data with one tributary station (41) the tributary link of which has failed said switching device comprising:

- connections (17, 18) for permanently connecting the transmitter of said control device to the transmitting side of said telephone switched network, as soon as said control device has been warned that said tributary link has failed;
- a detecting circuit (31) connected between the receiving side of said telephone switched network and the receiver of said control device, adapted to detect a heading signal transmitted by the tributary station associated with said failed tributary link; and
- a two-position switch (30) controlled by said control device for disconnecting the receiver of said control device from the receiving side of said principal link and connecting it to the receiving side of said telephone switched network in response to the reception of said heading signal by said control device.

2. The switching device according to claim 1 wherein said heading signal is a tone the frequency of which is out of the data band, and said detecting circuit (31) is a pass-band filter adapted to detect said tone.

3. The switching device according to claim 1 or 2 wherein said control device is a control modem (11), said tributary stations are tributary modems (41) in a multipoint configuration, said principal link (13, 15) being a leased link for exchanging data between said control modem and each of said tributary modems.

4. The switching device according to claim 3 wherein the exchange of data between said control modem (11) and said tributary modems (41) is made over a twowire link.

5. The switching device according to claim 4 further comprising a two-position switch (50) in the tributary modem (41) the tributary link (13') of which has failed for connecting the receiving part of said tributary modem to said two-wire link of the telephone switched network as soon as said control modem is warned that said associated link has failed;

- a normally closed switch (60) in said control modem (11) connecting the transmitting part (12) of said control model to said two-wire link, said switch being opened when said tributary modem transmits data to said control modem so as to cut off the transmission of the continuous carrier from said control modem to said tributary modem; and
- a normally closed switch (70) in said tributary modem connecting the receiving part of said tributary modem to said two-wire link, said switch being opened when said tributary modem transmits data to said control modem in order to avoid said receiving part receiving data sent by the transmitting part (42) of said tributary modem.

* * * * *